R. D. BROWN.
Raking Attachment to Harvesters.
No. 1,963. Reissued May 23, 1865.
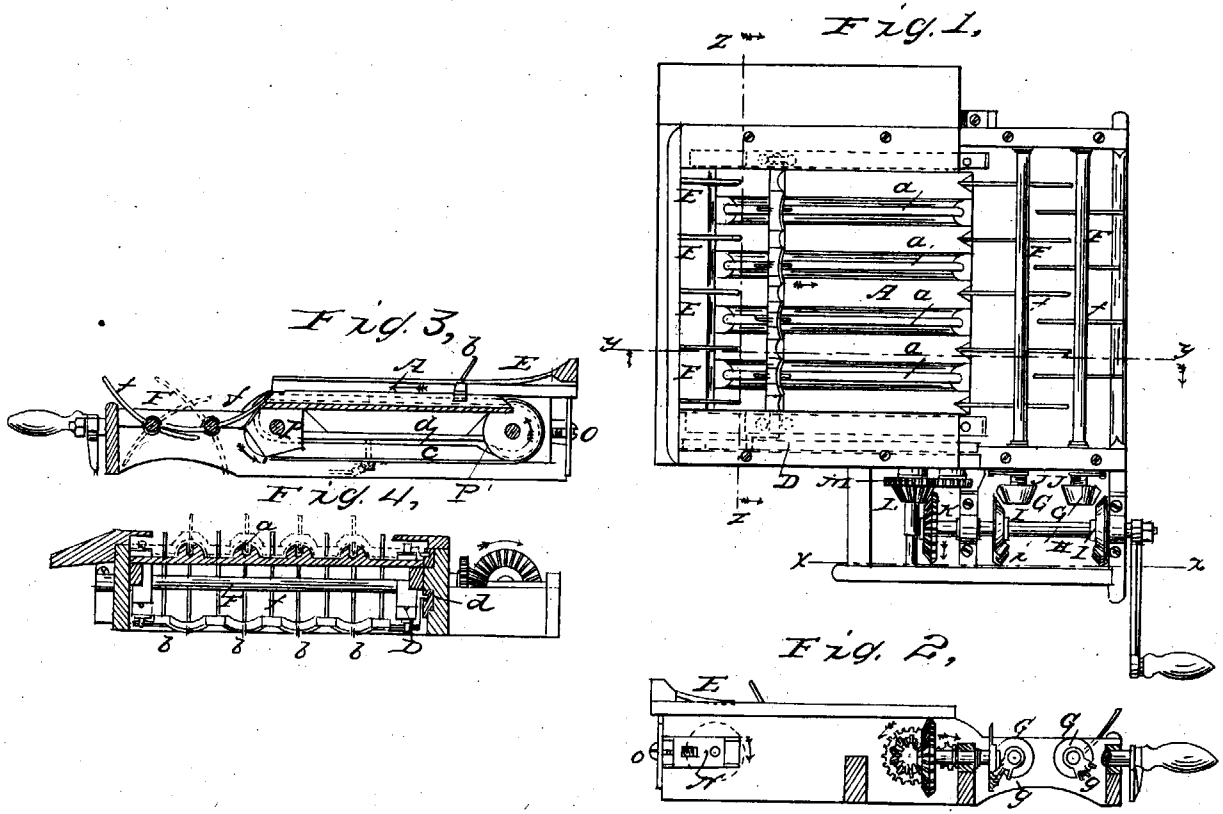
Witnesses:
Octavius Knight
Chas Smith
Inventor:
R. D. Brown
N. PETERS, Photo-Lithographer, Washington, D. C.

UNITED STATES PATENT OFFICE.

ROBERT D. BROWN, OF COVINGTON, INDIANA.

IMPROVEMENT IN RAKING ATTACHMENTS TO HARVESTERS.

Specification forming part of Letters Patent No. 38,094, dated April 7, 1863; Reissue No. 1,876, dated February 21, 1865; Reissue No. 1,963, dated May 23, 1865.

*To all whom it may concern:*

Be it known that I, ROBERT D. BROWN, of Covington, in the county of Fountain and State of Indiana, have invented a new and Improved Automatic Rake for Harvesting-Machines; and I do hereby declare the following to be a full, clear, and exact description of the same, reference being had to the accompanying drawings, making part of this specification, in which—

Figure 1 is a plan of the apparatus. Fig. 2 is a vertical section at *x x*. Fig. 3 is a vertical section at *y y*. Fig. 4 is a vertical section at *z z*.

Similar letters of reference indicate corresponding parts in the several views.

The prominent feature of novelty in my said invention consists in a rake carried over and beneath the platform by endless chains or belts revolving in vertical planes, the said rake being journaled in its carrying-belts and guided by a slot in the frame, as will be hereinafter explained.

The invention further consists in the use, in combination with the aforesaid rake, of an intermittent device, hereinafter described, depositing the gavels compactly upon the ground.

In order to enable those skilled in the art to which my invention appertains to fully understand and use the same, I will proceed to describe its construction and operation.

A represents the platform on which the grain falls as it is cut. The said platform is provided with a series of grooved ribs, *a a*, the purpose of which will be presently understood.

B represents a rake pivoted to endless chains or belts C C, which are carried over and beneath the platform A by means of pulleys P P′. The head of the said rake is by preference, but not necessarily, formed with a series of curves to fit the ribs *a a*, as represented in red lines in Fig. 4, in the summit of which curves its teeth *b b* are fixed. The teeth project to a sufficient height above the head to catch and convey all the grain upon the platform and project downward into the groove, as shown.

D is a crank-arm projecting rigidly from the rake-head at right angles, or nearly so, with the teeth *b*, and traversing an eccentric groove, *d*, in the main frame, which groove is so formed as to turn the rake alternately to its working and its retracted position, as will be hereinafter explained. This groove may be of any form which will answer the purpose, and which is adapted to the projection which works within it, or to the work to be accomplished.

E E are stationary guard-teeth, projecting from the main frame over the end of the platform to prevent the escape of grain.

F F are a pair of shafts provided with curved teeth *f f*, and together constituting a cradle, into which the grain is deposited from the platform. The said shafts receive an intermittent motion to deposit the grain in compact gavels upon the ground by means of the following mechanism:

G G are bevel-pinions, each provided with one, two, three, or more cogs, *g g*, occupying a suitable portion of its periphery.

H is a driving-shaft, carrying two bevel-wheels, I I, each provided with a limited number of cogs *i i*, and with a cam-surface, *i′*, formed of an elongation of the last cog of the series.

J J are spiral springs employed to restore the cradle F *f* to its normal position when released by the cams *i′*, as hereinafter explained. Motion may be transmitted from the driving-shaft H to the propelling-pulleys P of the rake through the medium of the gearing K L M, or in any other suitable way. The shaft of the pulleys P′, by which the rake-belts are stretched, runs in adjustable boxes N N, which may be moved in or out by set-screws O O to regulate the tension of the belts as required.

Operation: The parts being set in motion in the directions indicated by the arrows, the rake, passing under and between the stationary teeth E, is drawn over the platform, sweeping off all the grain which has accumulated thereon since its last stroke and depositing it in the cradle F *f*, and is then by the continuous motion of the belts C carried beneath the platform. The upper part of the eccentric groove *d*, being nearly on a level with the upper part of the belts C, elevates the teeth of the rake to a vertical position as they pass over the pulleys P′, and so retains them while traversing the upper side of the platform; but as the rake passes beneath the platform the groove, being here higher than the chain, retracts the teeth to a horizontal position, so that they may occupy the smallest possible space in their return motion.

By a suitable arrangement on the end of the rake-head of the crank-arm or its equivalent adapted to catch within the groove the required motion of the rake-head may be attained—that is to say, the necessary vibration may be effected—which will lay the teeth in a position to pass unobstructed or lie in the direction of the motion of the chains or will raise the teeth to a position at an angle with the belt, so that they will catch the grain, as described.

The slot is material to the effective construction and use of my machine; but no particular form is sought to be claimed. It is capable of modification to suit the device which is made to traverse in it, which is such as will give the required vibration to the rake-head to change the position of the teeth relatively to the belt, by which the rake-head is carried and operated.

At the instant that the cradle F *f* is supplied with grain the cogs *i* on the wheels I engage with the cogs *g* on the pinions G and impart a simultaneous rotation to the shafts F F, which turns the cradle to the position in the red lines in Fig. 3, so as to first compress the grain and then deposit it in a compact gavel upon the ground. The cams *i′ i′*, bearing against the last teeth of the pinions G, hold the shafts stationary for a sufficient period to permit the grain to fall and the machine to advance entirely clear of the gavel, and the pinions being then released by the continued motion of the wheels I, the springs J J restore the cradle F *f* to its former position, and the work proceeds as before.

Having thus described my invention, what I claim as new therein, and desire to secure by Letters Patent, is—

1. The continuously-revolving rake B, carried forward over the platform and back beneath the same by means of driving chains, belts, or their equivalents, and elevated to its working position during its forward motion and retracted in passing beneath the platform by means of a crank-arm, D, or its equivalent working in a slot, for the purposes specified.

2. Governing the position of the rake-teeth by the partial rotation of the rake-head, which travels parallel with the cutter-bar, by means of an endless belt or chain when the said rotation is effected by the traversing of a wrist attached to the rake-head in a slot of the required configuration.

3. The intermittent cradle F *f*, operated as described, in combination with the continuously-revolving rake B, for the purposes set forth.

ROBERT D. BROWN.

Witnesses:
DAVID RAWLES,
I. HISTINE.